Figure 1:
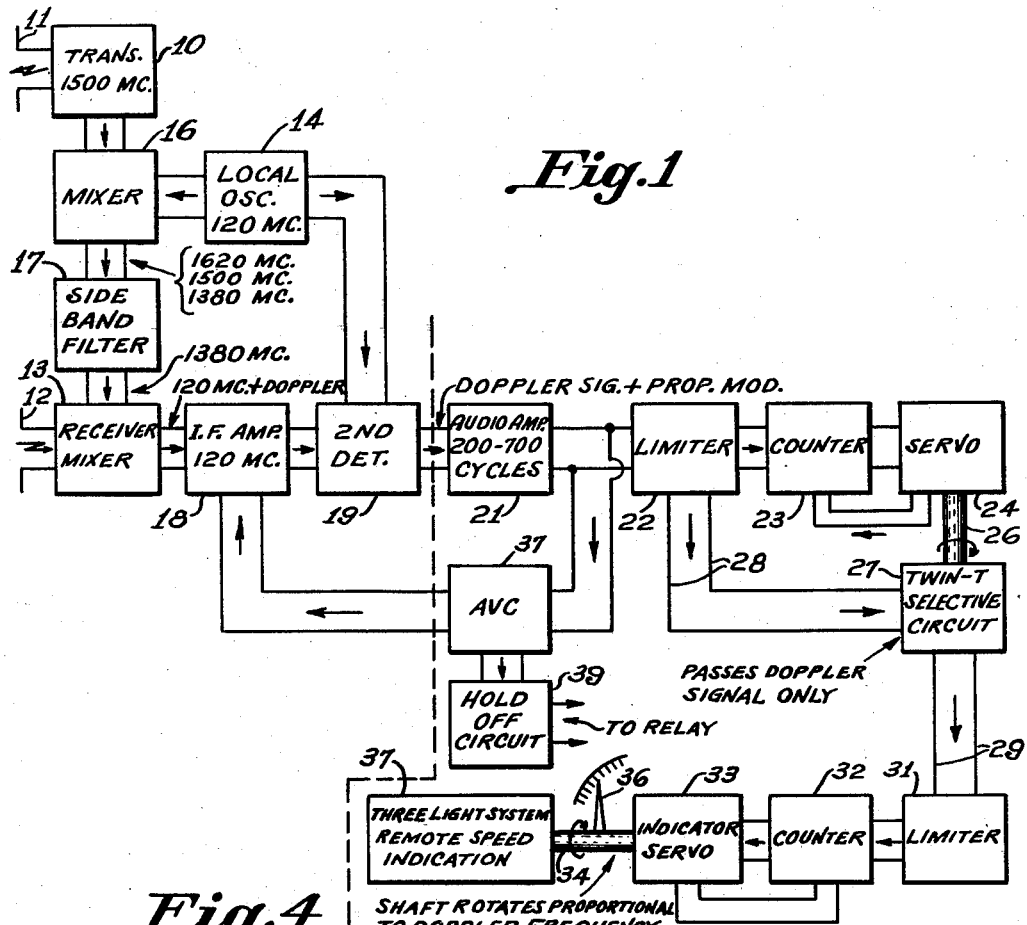

Jan. 9, 1951   C. C. MARTINELLI   2,537,596
AIRCRAFT SPEED MEASURING SYSTEM DESIGNED
TO AVOID PROPELLER MODULATION EFFECTS
Filed Jan. 29, 1947   3 Sheets-Sheet 3

Inventor
Ciro C. Martinelli
Attorney

Patented Jan. 9, 1951

2,537,596

UNITED STATES PATENT OFFICE 2,537,596

AIRCRAFT SPEED MEASURING SYSTEM DESIGNED TO AVOID PROPELLER MODULATION EFFECTS

Ciro C. Martinelli, Princeton, N. J., assignor to Radio Corporation of America, a corporation of Delaware Application January 29, 1947, Serial No. 724,985

7 Claims. (Cl. 343—8)

My invention relates to radio apparatus that utilizes a reflected radio signal and the Doppler effect for determining relative speeds and particularly to apparatus for determining the speed of approach of an aircraft about to land. In designing such equipment it has been found that the presence of propeller modulation on the reflected signal makes it necessary to take special precautions in the equipment design if successful operation is to be obtained.

For example, the specific apparatus described hereinafter transmits at a frequency of 1500 megacycles per second. It is designed for aiding in the landing of aircraft on aircraft carriers where the relative speed of the aircraft and the carrier may be as low as 40 knots. Under these conditions the Doppler beat frequency will be as low as 200 cycles per second. Certain types of carrier type aircraft have four-bladed propellers and when making carrier approaches may have rotational speeds as high as 2500 R. P. M. with a resulting propeller modulation frequency of approximately 160 cycles per second. It has been observed, however, that generally the propeller modulation frequency is from 60 to 90 cycles per second. This propeller modulation is both amplitude and frequency modulation of the Doppler frequency signal.

Since the Doppler frequency is a function of the closing speed of an aircraft, i. e., of the relative speed of the aircraft and the aircraft carrier, fixed filters cannot be used to obtain the desired separation of the Doppler frequency and the propeller modulation frequency. It will be apparent that with the Doppler frequencies and the propeller modulation frequencies so close together it is a problem to separate them over a range of Doppler frequencies. The range of Doppler frequencies usually is from about 250 cycles per second to 350 cycles per second, corresponding to speeds of from 50 knots to 70 knots.

The problem is further complicated by the fact that the signal due to propeller modulation is not a definite fixed frequency but, instead may be represented by sidebands of the Doppler frequency signal with all components fluctuating at a fairly fast rate. The signal may fluctuate from a condition where most of the energy is in one side band to one where most of the signal is in the other side band.

An object of the invention is to provide an improved method of and means for determining the speed of approach of an aircraft.

A further object of the invention is to provide an improved method of and means for determining the relative speed of an aircraft and an aircraft carrier.

A still further object of the invention is to provide in a relative speed determining system an improved method of and means for separating propeller modulation currents from Doppler frequency currents.

A still further object of the invention is to provide an improved speed determining radio system of the type utilizing reflected radio waves.

According to a preferred embodiment of the present invention, an unmodulated radio wave is transmitted toward the approaching aircraft and the reflected signal is mixed at the receiver with signal direct from the transmitter. The Doppler signal is then obtained by demodulating the signal thus mixed. The resulting demodulated signal contains not only the desired Doppler signal but also a group of signals produced by the rotating propeller of the aircraft as previously explained. This mixture of signals is amplified and passed through a limiter to a frequency counter which is connected in a servomotor circuit so that the motor shaft assumes an angular position that is a function of the frequency measured by the counter.

The servo system is given a time constant that is slow compared with the frequency fluctuations introduced by the propeller modulation. The result is that the servomotor shaft assumes an angular position representative of the mean or average frequency of signals applied to the frequency counter. In operation the servomotor shaft will be continually in motion, but although the motion will be within limits representing a narrow frequency range this shaft cannot be used to provide an accurate reading of the closing speed. Instead this shaft is connected to a frequency selective circuit to tune it automatically to the Doppler frequency that is obtained as an aircraft comes in to land. Some of the signal from the limiter preceding the counter is supplied to the selective circuit whereby its output signal is the Doppler frequency signal substantially free of propeller modulation signal.

This Doppler frequency signal is then passed through another limiter and supplied to another frequency counter which is connected in a servo system for providing a direct indication of the closing speed and for operating speed indicator lights.

Figure 2:
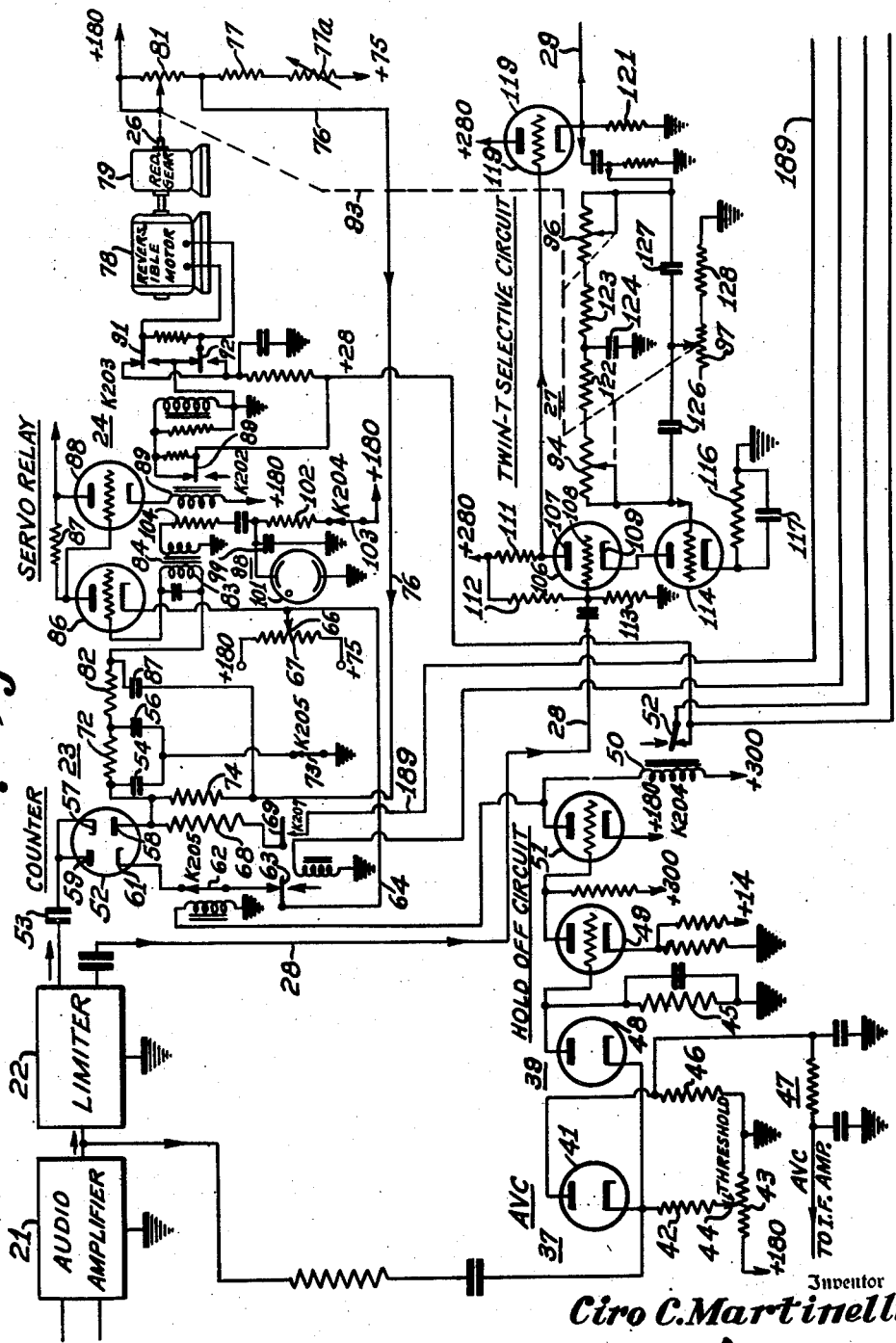
Figure 3:
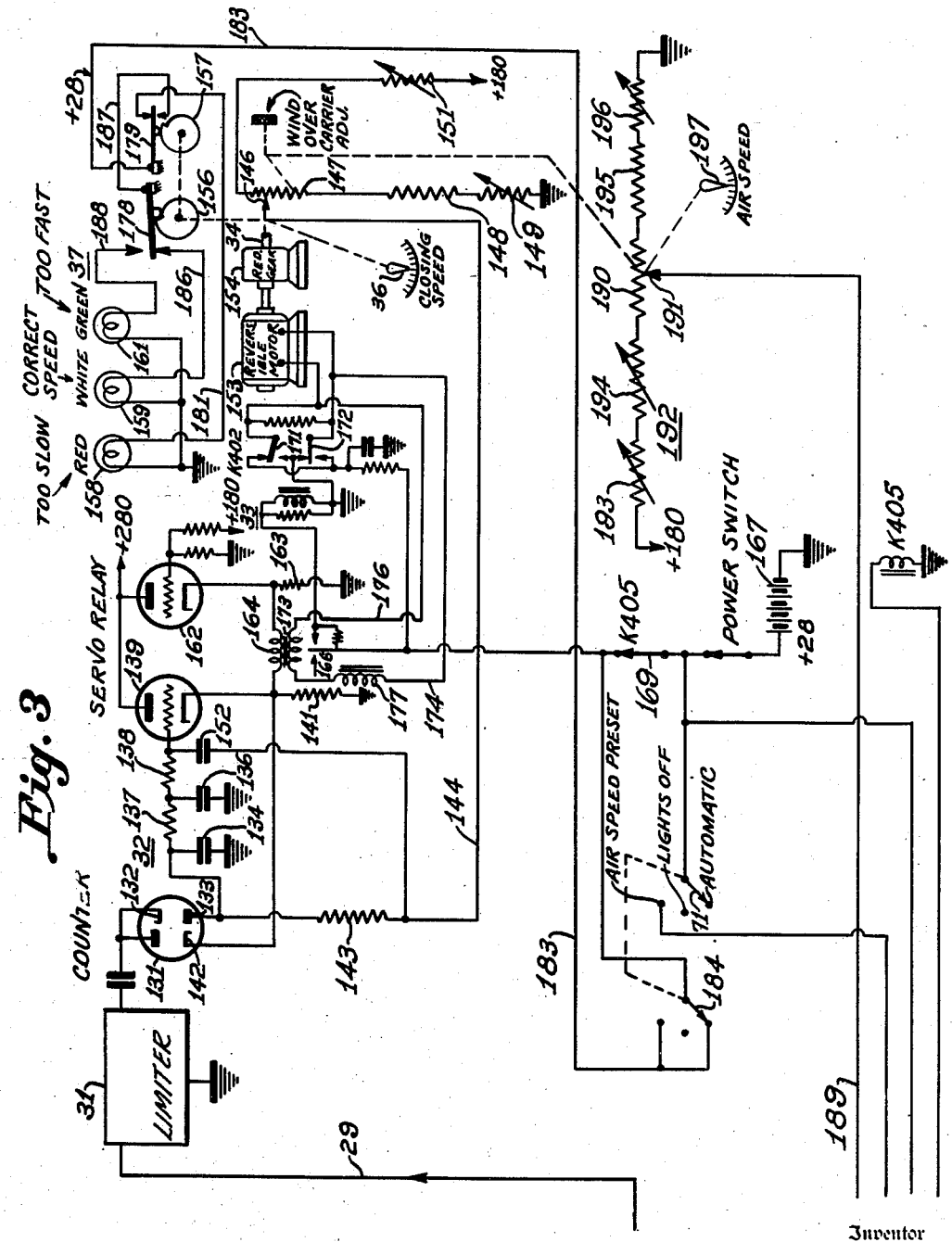

The invention will be better understood from the following description taken in connection with the accompanying drawing in which Figure 1 is a block diagram of one embodiment of the invention, Figures 2 and 3 placed end to end are a circuit diagram of the portion of the circuit in Fig. 1 shown at the right of the broken line.

Figure 4 is a view of the mechanical arrangement of a portion of the apparatus shown in Fig. 3.

In the several figures similar parts are indicated by similar reference characters.

Fig. 1 shows an embodiment of the invention comprising a radio transmitter 10 that supplies an unmodulated carrier wave to a directive antenna 11 from which the carrier wave is radiated toward the aircraft approaching for a landing. After reflection from the aircraft, the carrier wave is picked up by a receiving antenna 12 and supplied to a mixer or first detector 13 of a superheterodyne type receiver.

The local heterodyning signal is obtained from a local oscillator 14 operating at the desired intermediate frequency which, in the present example, is 120 megacycles per second. Signal from the oscillator 14 and signal from the transmitter 10 are supplied to a mixer 16. Assuming a transmitter frequency of 1500 megacycles per second, the resulting mixer output consists of the 1500 mc. carrier and the upper and lower sidebands of 1620 mc. and 1380 mc., respectively. The mixer output is supplied to a side band filter 17 which passes only the lower side band signal of 1380 mc. and supplies it to the mixer 13 where it mixes with the reflected signal of 1500 mc. plus Doppler frequency where the aircraft is approaching. The output of mixer 13 comprises the I.-F. carrier of 120 mc. plus Doppler frequency. This signal is amplified by an I.-F. amplifier 18 and supplied to a second detector 19 where it beats with 120 mc. signal supplied from the local oscillator 14.

The output of the detector 19 is the desired Doppler frequency signal which indicates the speed of the approaching aircraft but, in addition, the output includes undesired propeller modulation signal as previously explained. This output is amplified by an audio frequency amplifier 21 which may be designed to pass a band of frequencies of from 200 to 700 cycles per second. Cut-off at the lower frequencies is desirable to reduce the effects of sea-return signals and cut-off at the higher frequencies is desirable to reduce noise signals.

The output of amplifier 21 is supplied through an amplitude limiter 22 to a frequency counter 23. The counter 23 controls a servomotor system 24 to drive a shaft 26 in one direction or the other as a function of the frequency of the signal supplied to the counter 23. The shaft 26 controls the tuning of a selective circuit 27 to keep it tuned approximately to the Doppler frequency. Signal from the limiter 22 is supplied over conductors 28 to the selective circuit 27 whereby an output is obtained that is free of most of the propeller modulation interference. This output is supplied over conductors 29 to an amplitude limiter 31.

The output of limiter 31 is applied to a frequency counter 32 the output of which controls a servomotor system 33 which drives a shaft 34 in one direction or the other as a function of the Doppler frequency measured by the counter 32. The closing speed of the aircraft may be read directly from a pointer and dial indicated at 36.

The shaft 34 also controls a switching arrangement 37 of colored lights which indicate whether the closing speed is correct, too slow or too fast.

The system is provided with an automatic gain control or AVC circuit 38 and also with a hold-off circuit 39 for holding the counter and servo units in an unchanged condition when the incoming signal fades out. Thus the system can pick up its proper control action as soon as the signal comes back to its normal strength.

The details of the portion of the system at the right of the broken line in Fig. 1 are shown in Figs. 2 and 3. Referring to these figures, the AVC circuit comprises a diode 41 that has its cathode connected through a resistor 42 to a point on a potentiometer resistor 43 by way of a variable tap 44. Adjustment of the tap 44 sets the threshold or delay voltage. The anode of diode 41 is connected through an output resistor 46 to the grounded end of the potentiometer resistor 43. AVC voltage is taken off the anode end of resistor 46 and supplied through a filter 47 to the I.-F. amplifier 18 (Fig. 1).

A hold-off circuit comprises a diode 48 that has its cathode connected to the cathode end of resistor 42 so that the diode 48 receives signal from the audio amplifier 21 and so that the resistor 42 provides the direct-current return path for diode 48 as well as for diode 41. The anode of diode 48 is connected through an output resistor 45 to ground and is direct-current coupled to the grid of a triode 49. The anode of triode 49 is direct-current coupled to the grid of a triode 51. The anode circuit of triode 51 includes the coil 50 of a relay K204 so that the armature 52 of this relay is on the lower contact point when the coil 50 is energized, thus energizing a relay, K405 (Fig. 3). Another armature of the relay K204 which is also actuated by the coil 50 but shown at a different point in the drawing is provided for a purpose described hereinafter.

The relay K204 is energized so long as the received signal is of sufficient strength and is de-energized when the signal fades away. The operation is as follows: Signal from the amplifier 21, when of usable amplitude, produces current flow through the diode 48 and the output resistor 45 thus making the anode end of resistor 45 negative and biasing the tube 49 to plate current cut-off. This makes the grid of the tube 51 more positive whereby the resulting plate current flow energizes the relay K204. It may be noted that even though the current flow through the resistor 42 is in the direction to keep the diode 48 from conducting, the applied signal causes diode 48 to conduct because its amplitude is about twice that of the voltage drop in the resistor 42, the resistors 42 and 46 being of about the same resistance.

The AVC circuit associated with the diode 41 has a slow time constant which is required for good AVC action, while the circuit associated with the hold-off diode 48 has a fast time constant so that the counter and servo system is promptly put under control of the received signal as soon as it comes back to usable strength after a fade. The control action of the hold-off circuit will be discussed more in detail hereinafter.

Referring now to the counter and servo system shown in Fig. 2, the counter 23 comprises a pair of oppositely connected diodes in a common envelope 52 to which the square wave from limiter 22 is applied through a capacitor 53 of comparatively small capacity. Storage capacitors 54 and 56 of comparatively large capacity have a charge supplied to them through the cathode 57 and the anode 58 of one diode upon the occurrence of each negative half cycle of the square wave from the limiter 22. Since the capacitor 53 is small enough to reach full charge shortly after the beginning of a square wave half cycle, the storage capacitors 54 and 56 are charged up a fixed additional amount each time a negative half cycle occurs whereby the voltage thereacross is proportional to the frequency of the limiter output signal.

The diode comprising an anode 59 and a cathode 61 is provided to discharge the capacitor 53 at the end of each negative half cycle to prevent it from blocking. The cathode 61 is connected to a positive bias when the relay K205 is energized as illustrated, i. e., when there is a usable incoming signal, assuming that the relay K207 is not energized. The relay K207 is never energized unless the switch 71 shown in Fig. 3 is set on the "air speed preset" position. This connection to the positive bias voltage is through the armature 62 of relay K205, through the armature 63 of relay K207 and through a lead 64 and an adjustable tap 66 to a point on a potentiometer resistor 67.

The anode 58 is connected through a resistor 68 to the armature 69 of the relay K207 but this circuit is open unless the switch 71 (Fig. 3) is on the "air speed preset" position. In the drawing all relay and switch positions are shown for the condition of automatic operation for tuning the selective circuit 27 automatically and for the condition of an incoming signal of usable strength.

In the present example, the counter storage capacitors 54 and 56 are the shunt elements of a resistor capacitor filter having a series resistor element 72 so that a fairly long electrical time constant is provided. The low potential sides of the capacitors 54 and 56 are connected to ground through the armature 73 of the relay K205 unless the signal fades out, in which case the circuit to ground is opened and the capacitors hold the charge they had at the moment of signal fading.

The diode anode 58 is also connected through a resistor 74 and a lead 76 to a point of positive potential on a potentiometer resistor 77. This is a servo connection and changes the positive bias potential on the anode 58 as the servomotor 78 operates to bring the frequency counter to a balanced condition. The motor 78 is reversible and through reduction gears 79 drives the tap 81 on potentiometer 77 in one direction or the other to short out varying amounts of the potentiometer resistance thereby varying the potential applied to the lead 76.

The high potential end of the storage filter 54, 56, 72 is connected through an isolating resistor 82 and through the secondary 83 of a transformer 84 to the grid of a relay amplifier tube 86. A derivative or anticipator capacitor 87 is connected between the lead 76 and the grid end of resistor 82 to provide suitable damping for the servo system.

The amplifier tube 86 has an operating voltage applied to its anode through a plate resistor 87. The cathode of the tube 86 is connected to a positive bias potential on the resistor 67.

The anode of the tube 86 is direct-current coupled to the grid of a cathode follower tube 88 which has the coil 89 of a relay K202 in its cathode circuit. When the relay K202 is energized, the relay armature 89 is in the position shown to energize the relay K203 and pull the relay armatures 91 and 92 to the upper position illustrated. This connects the motor 78 to the 28 volt source to make it run in one direction. When the relay K202 is deenergized, the relay K203 is likewise deenergized, the armatures 91 and 92 drop down, and the motor 78 runs in the opposite direction.

The shaft 26 is coupled, as indicated by the broken line 93, to three variable taps on resistors 94, 96 and 97 of the twin-T frequency selective circuit 27 so that the tuning of this circuit is a function of the angular position of the shaft 26. As a result, substantially only the Doppler frequency component of the signal applied to the selective circuit 27 by way of the lead 28 appears on the output lead 29. Before describing the selective circuit in further detail, certain features of the servo system 24 will be discussed.

In order to control hunting of the servo system, the motor 78 is made to oscillate about the balance point by introducing a ripple voltage on the grid of the relay amplifier 86. This is done in the present example by supplying a sawtooth wave to the transformer 84 from a generator 98. The generator 98 is a relaxation oscillator comprising a capacitor 99 that is shunted by a gas tube 101. A charging voltage is applied to the capacitor 99 through a resistor 102 so long as the armature 103 of the relay K204 is closed as is the case except when the signal fades out. The capacitor 99 charges and discharges periodically through the gas tube 101 to produce a sawtooth wave which is applied through a resistor 104 to the primary of the transformer 84. The secondary 83 preferably is tuned to the repetition rate of the sawtooth wave so that substantially a sine wave is impressed upon the grid of the tube 86.

The overall time constant of the counter 23 and servo-motor system 24 is rather long and may be three or four seconds for example. This causes the counter and servo system to operate on an average of the applied frequency components, the average being taken over a period long enough to prevent a strong frequency component due to propeller modulation and of short duration from affecting the angular position of the servo motor shaft 26 any great amount. At the same time, this time constant is not so long as to prevent the servo system from following changes in speed of the approaching aircraft.

In the apparatus illustrated, the above-mentioned overall time constant is provided about equally by the storage filter 54, 56, 72 and by the reduction gearing 79. It will be apparent that most of the desired time constant can be provided at 79 if desired by using a greater gear reduction ratio.

Referring now in more detail to the twin-T selective circuit 27, it comprises an amplifier tube 106 having an anode 107, a grid 108 and a cathode 109. Operating voltage is applied to the anode 107 through an anode resistor 111. A positive bias voltage is applied to the grid 108 from the junction point of potentiometer resistor 112 and 113.

The cathode 109 is connected to ground through the anode-cathode impedance of a vacuum tube 114 and through a cathode bias resistor 116 for the tube 114. The resistor 116 is bypassed for audio frequency signals by a capacitor 117.

The anode of the tube 106 is direct-current connected to the grid 118 of a cathode follower tube 119 having a cathode output resistor 121.

The desired frequency selection is obtained by a degenerative feed-back connection from the cathode of the tube 119 to the grid of the tube 114 through a twin-T filter which includes the variable resistor elements 94, 96 and 97. The twin-T circuit will pass all frequencies except the Doppler frequency to which it is kept tuned by the servo system 24 during automatic operation of the equipment. Thus, the selective circuit is highly degenerative for all frequencies but the Doppler frequency whereby substantially only the Doppler frequency is supplied to the output lead 29.

The twin-T filter is of a well known type comprising the series variable resistor 94 and 96 of the same resistance value $R_0$, the series fixed resistors 122 and 123 of the same resistance value $R_1$, a shunt capacitor 124 of capacity 2C, bridging capacitors 126 and 127 each of capacity C, and a resistance arm from the junction point of capacitors 126 and 127 to ground comprising the variable resistor 97 of resistance $$\frac{R_0}{2}$$

and the fixed resistor 128 of resistance $$\frac{R_1}{2}$$

The resonant frequency $f$ of this filter (at which there is a transmission null) is given by the equation $$f = \frac{1}{2\pi(R_0+R_1)C}$$

It can be shown that for proper tracking of the resonant frequency of the selective circuit 27 with the input frequency to the counter 23 the ratio of $R_0$ to $R_1$ must always be equal to the ratio of the follow-up potentiometer resistor values $R_2$ to $R_3$ where $R_2$ is the resistance of potentiometer resistor 81 and $R_3$ is the sum of the resistances of potentiometer resistors 77 and 77a. This condition can readily be obtained by using linear resistors of the proper values and by providing a screw driver adjustment for the resistor 77a.

Referring to Fig. 3, the Doppler frequency signal, now substantially free of propeller modulation, is supplied by way of the lead 29 and the limiter 31 to the frequency counter 32 which is similar to the counter 23 but provided with a comparatively short time constant. The counter 32 comprises a pair of oppositely connected diodes in a common envelope 131. Upon the occurrence of each negative half cycle of the square wave output from the limiter 31 a pulse of current passes through the diode having elements 132 and 133 to apply a charge to the storage filter comprising elements 134, 136 and 137. The high potential side of filter 134, 136, 137 is connected through an isolating resistor 138 to the grid of a cathode follower tube 139 having a cathode output resistor 141.

The other diode of the counter 32 has its cathode 142 connected to a positive bias point at the cathode end of resistor 141.

The anode 133 of the counter diode 132, 133 is also connected through a resistor 143, a follow-up lead 144 and a variable tap 146 to a point of positive bias potential on the resistor 147 of a follow-up potentiometer. This follow-up potentiometer comprises the resistor 147, a resistor 148 and two resistors 149 and 151 which are adjustable for calibrating purposes. In any Doppler frequency range it is only necessary to adjust resistors 149 and 151 until the voltage across the follow-up potentiometer over the desired angular rotation of the servo shaft 34 is equal to the voltage developed by the counter 32 over the desired frequency range. A differentiator capacitor 152 is connected from the lead 144 to the grid of the cathode follower tube 139 for suitably damping the servo system.

The follow-up tap 146 is driven in one direction or the other by a reversible motor 153 through reduction gears 154 and the shaft 34. The shaft 34 assumes an angular position that is a function of Doppler frequency, and therefore, of the closing speed which may be indicated by a pointer 36 connected to the shaft 34 and associated with a dial calibrated in knots. The shaft 34 is also coupled to a pair of cams 156 and 157 for operating the speed indicator lights 158, 159 and 161 as described hereinafter.

Referring now to the servo relay operation for controlling the servomotor 153, the servo relay comprises a second cathode follower tube 162 having a cathode output resistor 163 and having its grid connected to a point of positive bias potential. Connected between the cathode ends of resistors 141 and 163 is a relay coil 164 of a polarized relay for actuating a relay armature 166. The direction of current flow through the coil 164 depends upon whether the counter output voltage on the grid of tube 139 brings the cathode of this tube above or below the fixed potential of the cathode of the tube 162. When the relay coil current flows in one direction the armature 166 pulls over to the right so that the polarity reversing relay K402 is energized by the 28 volt source 167 providing the power switch 168 and the armature 169 of the relay K405 are in their closed positions. The armature 169 will be in the closed position illustrated providing a usable signal is being received since the relay K405 is energized so long as the hold-off relay K204 is energized.

When the reversing relay K402 is energized, the relay armatures 171 and 172 are pulled up and the motor 153 is driven in one direction. When the current through the relay coil 164 is reversed, the relay K402 is deenergized and the armatures 171 and 172 go to their lower position thereby reversing the direction of rotation of the motor 153.

In the servo system 33 hunting is minimized by providing a vibrating action for the relay 164, 166 instead of by superimposing an alternating-current component as in the servo system 24. This vibrating action is obtained by means of a coil 173 that is wound on the coil 164 and connected through leads 174 and 176 to the input leads of the motor 153. Each time the current flow through the coil 164 moves the armature 166 in one direction, the resulting current flow to the motor 153 energizes the coil 173 by way of leads 174 and 176 so as to pull the armature 166 back in the other direction. Thus the relay 164, 166 vibrates at a rate that is largely determined by an inductance coil 177 that is connected in series with one of the leads 174 and 176. The rate of vibration may be about 20 times per second.

The overall time constant of the servo system 33 is fast as compared with that of the servo system 24 so that the speed indication follows closely any changes in the closing rate.

Referring in more detail to the cam control of the speed indicator lamps 158, 159 and 161, the cams 156 and 157 actuate switch arms 178 and 179, respectively, so that as the two cams are rotated to different positions by the servo shaft 34 the operation is as follows: With the cams in the position shown, the arms 178 and 179 are in contact with their lower and upper contact points, respectively, and the red light 158 only is lighted indicating the closing speed is too slow.

The circuit for the light 158 is from ground, through the filament of the light 158, through the lead 181, the upper contact point of the switch arm 179, and through the switch arm 179 to the lead 183 supplying 28 volts to the lamps. There are 28 volts on the lead 183 for operating the lights if the switch arm 184, which is ganged with switch arm 71, is in either the "automatic" position shown or in the "air speed preset" position, provided the power switch and the relay armature 169 are closed. The indicator lights may be cut off by moving the switches 184 and 171 to their middle position.

If the closing speed is increased to the correct value, the servo shaft 34 rotates the cams 156 and 157 counter-clockwise sufficiently to bring the switch arm 179 in contact with its lower contact point, switch arm 178 remaining on its lower contact point. This lights the white lamp 159 only, the high side of the lamp filament being connected through the lead 186, the lower contact point of the switch arm 178, the arm 178, the lead 187, and through the lower contact point of switch arm 179 and the arm 179 to the lead 183.

If the closing speed is too fast, the servo shaft 34 rotates the cams counter-clockwise sufficiently to bring the switch arm 178 in contact with its upper contact point, the switch arm 179 still being in contact with the lower contact point. This lights the green lamp 161, the circuit from the high side of the lamp filament being through the lead 188, the switch arm 178, the lead 187, and through the switch arm 179 to the lead 183.

It may be desirable at times to operate the system by setting the selective circuit 27 to a fixed Doppler frequency so that the indicator servo 33 is operated by applied signal only when an aircraft is approaching at the correct closing speed. Thus, in the present example there will be no operation of the indicator lights except when the white light 159 lights up to indicate that the closing speed is correct. To operate the system in this manner, the switches 71 and 184 are moved to the "air speed preset" position. This energized the relay K207 (Fig. 2) so as to connect the anode 58 of the counter 23 to a lead 189, and through the lead 189 to a variable tap 191 on the resistor 198 of a potentiometer 192. By changing the position of the tap 191, an operator can change the angular position of the servo shaft 26 and, therefore, can adjust the tuning of the selective circuit 27. The potentiometer 192 includes a fixed resistor 195 and also variable resistors 193, 194 and 196 which are used to adjust the current through the potentiometer and to adjust its voltage with respect to ground so that the frequency selective circuit 27 tracks with the air speed pointer 197 coupled to the tap 191.

It will be noted that when the relay K207 is energized the cathode 61 of the counter 23 is disconnected from its positive bias supply so that the counter blocks and does not supply any signal to the servo system 24.

If the system is on automatic operation and the signal fades away, the counter 23 is blocked by the armature 62 of relay K205 being released to the open circuit position. During the fading period of low signal strength, the charge on capacitors 54 and 56 is prevented from leaking off because the armature 73 of the relay K206 is also released to its open circuit position. At the same time the ripple voltage is taken off the servo relay since the armature 103 of relay K204 is in its open circuit position thereby taking voltage off the oscillator 98. It will be apparent that as soon as the signal comes back to usable strength the operation of the servo system begins at the point where the operation had been stopped by the fading.

Fading away of the signal also results in de-energization of the relay K405 (Fig. 3) and opening of the relay armature 169 so that the 28 volt power supply to the servomotor 153 is broken. Thus the speed indication during a fading interval remains the same as it was at the time the last usable signal was being received.

A "wind over carrier" control is provided which is indicated in Fig. 3 and shown in more detail in Fig. 4. The function of this control is to add electrically to the follow-up voltage of the indicator servo a voltage which is proportional to the component of wind over the carrier which is in the direction opposite to the course of the aircraft. Actually, the control is the follow-up control potentiometer 147 which is mechanically mounted on the servo shaft 34 so that while the shaft rotates the brush 146 of the potentiometer, the "wind over carrier" control rotates the stator 147 or case of the potentiometer. This is shown more clearly in Figure 4. For servo system balance, the follow-up voltage at the tap 146 must equal the voltage developed across the frequency counter resistor 143. If the stator 147 of the potentiometer is moved with respect to the brush 146 the servo shaft 34 rotates the brush so that the resultant follow-up voltage is still equal to the counter voltage. Thus by rotating the stator 147, the servo shaft indicator 36 may be made to move with respect to the indicator dial and the pointer 36 will indicate the sum of measured closing rate and "set in" value of wind to give the airspeed of the aircraft.

While the indicator pointer reads airspeed, the selective circuit 27 must still be set to closing rate although with preset operation the airspeed control is set for the desired airspeed of the aircraft. Because of this it is necessary to subtract from the airspeed control a voltage equivalent to the wind. This is done by linking the stator 190 of the airspeed control potentiometer to the "wind over carrier" control. This mechanical connection is shown in Figure 4 as a shaft 200. Were this not done, the selective circuit 27 would, under preset operation, be set to airspeed instead of closing rate.

I claim as my invention:

1. In a radio system for measuring relative speed by reflected radio waves, radio transmitter means for transmitting radio waves toward a reflecting object, radio receiver means for receiving said waves after reflection from said object, means for deriving from said received signal a signal having a frequency that is a function of said relative speed, said derived signal having undesired rapidly fluctuating side band components, a filter tuning control means said control means having a time constant that is long compared with the rate of said fluctuations, means for supplying said derived signal to said control means and for operating said control means thereby, a filter circuit that is tunable to the frequency of said derived signal, means for causing said control means to tune said filter circuit substantially to said frequency in response to operation of said control means by application thereto of said derived signal, a frequency indicator means, and means for supplying said derived signal through said filter circuit to said frequency indicator means.

2. In a radio system for measuring relative speed by reflected radio waves, radio transmitter means for transmitting radio waves toward a reflecting object, radio receiver means for receiving said waves after reflection from said object, means for mixing said received signal with signal derived from said transmitter for obtaining a Doppler frequency signal, a servo system having a comparatively long constant with respect to fast variations in the received signal, means for supplying said Doppler frequency signal to said servo system and for operating said servo system thereby, a filter circuit that is tunable to said Doppler frequency, means for causing said servo system to tune said filter circuit substantially to said Doppler frequency in response to operation of said servo system by application thereto of said Doppler frequency signal, a frequency indicator means, and means for supplying said Doppler frequency signal through said filter circuit to said frequency indicator means.

3. In a radio system for measuring relative speed by reflected radio waves, radio transmitter means for transmitting radio waves toward a reflecting object, radio receiver means for receiving said waves after reflection from said object, means for mixing said received signal with signal derived from said transmitter for obtaining a Doppler frequency signal, said Doppler frequency signal having an undesired frequency modulation thereon which varies at a comparatively rapid rate, a servo system having a time constant that is long compared with said rapid rate, means for supplying said Doppler frequency signal to said servo system and for operating said servo system thereby, a filter circuit that is tunable to said Doppler frequency, means for causing said servo system to tune said filter circuit substantially to said Doppler frequency in response to operation of said servo system by application thereto of said Doppler frequency signal, a frequency indicator means, and means for supplying said Doppler frequency signal through said filter circuit to said frequency indicator means whereby the side band components resulting from said frequency modulation are substantially removed.

4. The invention according to claim 3 wherein said frequency indicator means comprises a frequency counter followed by a servo system having a comparatively short time constant.

5. In a radio system for measuring the relative speed of an aircraft and a reflecting surface by reflected radio waves, radio transmitter means for transmitting radio waves toward said aircraft, radio receiver means for receiving said waves after reflection from said aircraft, means for deriving from said received signal a signal having a frequency that is a function of said relative speed and that is unavoidably modulated by the propeller of said aircraft, a filter tuning control means said filter tuning control means having a time constant that is long compared with the rate of the fluctuations in the side band components of said propeller modulated signal, means for supplying said derived signal to said control means and for operating said control means thereby, a filter circuit that is tunable to the frequency of said derived signal, means for causing said control means to tune said filter circuit substantially to said frequency in response to operation of said control means by application thereto of said derived signal, a frequency indicator means, and means for supplying said derived signal through said filter circuit to said frequency indicator means.

6. In a radio system for measuring the relative speed of an aircraft and a reflecting surface by reflected radio waves, radio transmitter means for transmitting a continuous radio wave toward said aircraft, radio receiver means for receiving said waves after reflection from said aircraft, means for mixing said received signal with signal derived from said transmitter for obtaining a Doppler frequency signal that is unavoidably modulated by the propeller of said aircraft, a servo system having a time constant that is long compared with fluctuations in said frequency modulation, means for supplying said Doppler frequency signal to said servo system and for operating said servo system thereby, a filter circuit that is tunable to said Doppler frequency, means for causing said servo system to tune said filter circuit substantially to said Doppler frequency in response to operation of said servo system by application thereto of said Doppler frequency signal, a frequency indicator means, and means for supplying said Doppler frequency signal through said filter circuit to said frequency indicator means.

7. The invention according to claim 6 wherein means is provided for rendering said servo system inactive in response to a decrease in the strength of the received signal below a usable level.

CIRO C. MARTINELLI.

REFERENCES CITED

The following references are of record in the file of this patent:

UNITED STATES PATENTS

| Number | Name | Date |
|---|---|---|
| 2,268,587 | Guanella | Jan. 6, 1942 |
| 2,402,464 | Suter | June 18, 1946 |
| 2,406,316 | Blumlein et al. | Aug. 27, 1946 |
| 2,422,074 | Bond | June 10, 1947 |
| 2,423,023 | Hershberger | June 24, 1947 |
| 2,432,939 | Sanders | Dec. 16, 1947 |